H. N. GESSFORD.
NUT AND BOLT LOCK.
APPLICATION FILED FEB. 20, 1917.
1,242,342.
Patented Oct. 9, 1917.
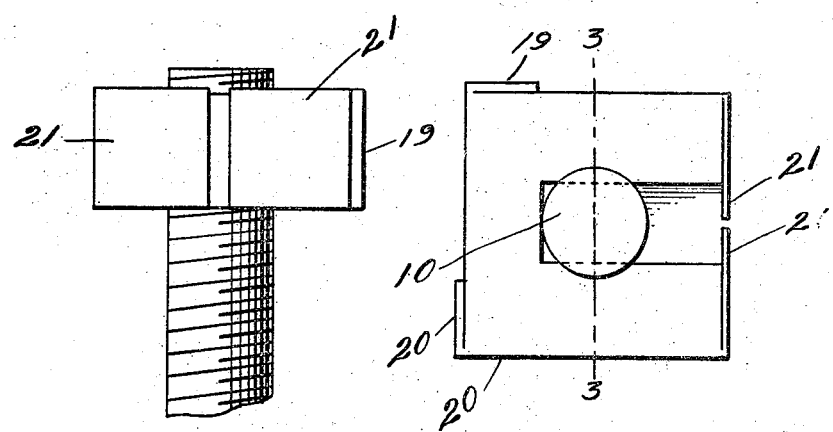
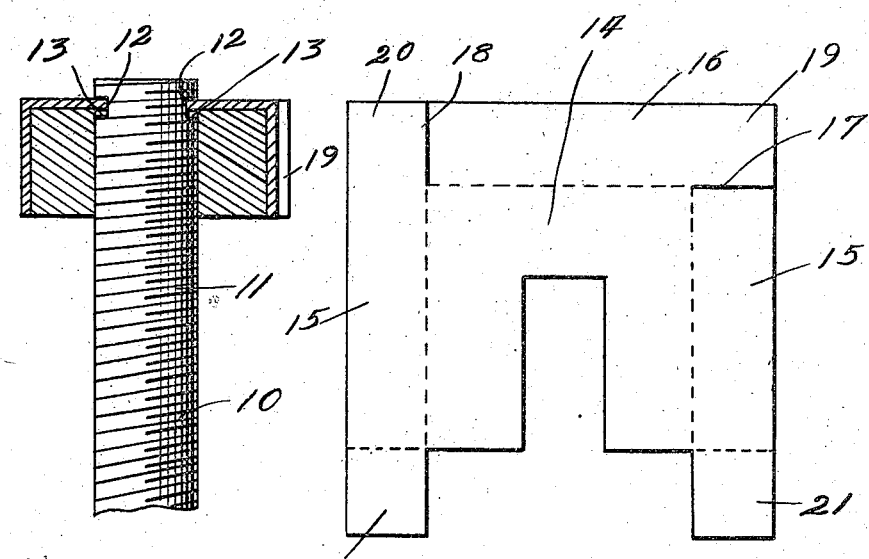
Inventor
H. N. Gessford
Attorneys

UNITED STATES PATENT OFFICE.

HENRY N. GESSFORD, OF CLIQUOT, MISSOURI.

NUT AND BOLT LOCK.

1,242,342.      Specification of Letters Patent.      Patented Oct. 9, 1917.

Application filed February 20, 1917. Serial No. 149,946.

*To all whom it may concern:*

Be it known that I, HENRY N. GESSFORD, a citizen of the United States, residing at Cliquot, in the county of Polk, State of Missouri, have invented certain new and useful Improvements in Nut and Bolt Locks; and I do hereby declare the following to be a full, clear, and exact description of the invention, such as will enable others skilled in the art to which it appertains to make and use the same.

This invention relates to improvements in locking devices, and particularly to locks for use on nuts and bolts.

One object of the present invention is to provide a novel and simple device for preventing the rotation of the nut on the bolt in either direction.

Another object is to provide a device of this character which is formed from a simple piece of metal.

Another object is to provide a device of this character which includes novel means of structure wherein the bolt and nut are effectively locked together and the nut prevented from turning on the bolt.

Other objects and advantages will be apparent from the following description when taken in connection with the accompanying drawing.

In the drawing:

Figure 1 is an elevation of a nut and bolt on which my invention is applied and in operative or locked position.

Fig. 2 is a top plan view of the device.

Fig. 3 is a sectional view taken on the line 3—3 of Fig. 1.

Fig. 4 is a plan view of the blank from which the locking device is formed.

Referring particularly to the accompanying drawing 10 represents a bolt which is provided with the usual threaded portion 11. Formed in the threaded portion, and on opposite sides therof, are the flattened faces 12, which result from the formation of the grooves which are made transversely of the bolt, as shown at 13. The locking device is adapted to coöperate with these grooves, as clearly shown in the drawing, and as will be now more clearly set forth.

The locking device is preferably formed from a single blank of metal which has a square body portion 14, on two of the opposite sides of which there are formed with wings 15. On one of the remaining sides there is formed a similar wing 16. The blank is cut on the lines 17 and 18 so as to provide a tab 19 of the wing 16 to extend transversely of the adjacent end of one of the wings 15, while a tab 20 is formed at one end of the other wing 15, which extends transversely of the adjacent end of the wing 16. The other end of each of the wings 15 extends beyond the unwinged side of the body in the form of a tab 21 its dimensions being equal to that of the tabs of the wings 15 and 16. Formed in the body, in parallel relation to the winged sides 15, is an open-ended slot 22 which is arranged to straddle the threaded portion of the bolt and have its side walls enter the grooves formed in the sides of said bolt.

When the locking device is thus engaged in the grooves of the bolt, the wings 15 and 16 are bent downwardly against the corresponding three side faces of the nut. The tabs 19 and 20 are then bent against the outer faces of the adjacent ends of the wings 16 and 15, respectively. The tabs 21 are then bent so as to extend toward each other and lie against the remaining side face of the nut. Thus the nut and bolt are firmly held against relative rotation so that the nut cannot back off.

Particular attention is called to the fact that the locking device is formed of a single piece of metal, whereby the device can be cheaply manufactured and can be operated with ease and success.

What is claimed is:

1. A nut and bolt lock including a bolt having the threaded portion oppositely grooved, and a locking member including a slotted body for engagement in the grooves of the bolt, wings on opposite sides of the body for engagement with opposite side faces of the nut of the bolt, and a tab on each of said wings for engagement with the adjacent end of a wing.

2. A nut and bolt lock formed from a single metal blank and including a body having a centrally formed open-ended slot, wings on two of the opposite sides of the body, tabs formed on opposite ends of one of said wings, and a wing on one of the remaining sides of the body and formed with a tab at one end thereof, one of the first-named wings having a tab at one end, the last-named tab and one of the tabs of the first-named wings being extended beyond the adjacent side of the body.

In testimony whereof, I affix my signature in the presence of two witnesses.

HENRY N. GESSFORD.

Witnesses:
ARTHUR C. REED,
MABEL HOOD.